US012416206B2

(12) United States Patent
Cooper et al.

(10) Patent No.: US 12,416,206 B2
(45) Date of Patent: Sep. 16, 2025

(54) HAND-HELD POWER TOOL

(71) Applicant: Black & Decker, Inc., New Britain, CT (US)

(72) Inventors: Justin Cooper, Shrewsbury, PA (US); Karla Plogstedt, Orlando, FL (US); Sean Allison Devine, York, PA (US)

(73) Assignee: Black & Decker, Inc., New Britain, CT (US)

( * ) Notice: Subject to any disclaimer, the term of this patent is extended or adjusted under 35 U.S.C. 154(b) by 105 days.

(21) Appl. No.: 18/164,493

(22) Filed: Feb. 3, 2023

(65) Prior Publication Data

US 2024/0263526 A1 Aug. 8, 2024

(51) Int. Cl.

| | |
|---|---|
| ***B25F 5/00*** | (2006.01) |
| ***B25F 5/02*** | (2006.01) |
| ***E21B 10/44*** | (2006.01) |
| ***E21B 11/00*** | (2006.01) |

(52) U.S. Cl.

CPC ............ *E21B 11/005* (2013.01); *B25F 5/001* (2013.01); *B25F 5/024* (2013.01); *E21B 10/44* (2013.01)

(58) Field of Classification Search

CPC ........ E21B 11/005; E21B 10/44; B25F 5/001; B25F 5/024; B25F 5/008

See application file for complete search history.

(56) References Cited

U.S. PATENT DOCUMENTS

| | | | |
|---|---|---|---|
| 3,554,293 A | 1/1971 | Aman et al. | |
| 6,595,298 B1 | 7/2003 | Crady | |
| 7,806,205 B2 | 10/2010 | Boeck | |
| 7,814,816 B2 | 10/2010 | Alberti et al. | |
| 8,714,277 B2 | 5/2014 | Lindh | |
| 9,308,638 B2 | 4/2016 | Kondo et al. | |
| 9,999,969 B1 | 6/2018 | Walter | |
| 10,890,031 B2 | 1/2021 | Goren | |
| 2005/0247466 A1 | 11/2005 | Andriolo et al. | |
| 2022/0347811 A1* | 11/2022 | Abbott .................. | B23Q 15/12 |

FOREIGN PATENT DOCUMENTS

| | | |
|---|---|---|
| DE | 102010041097 A1 | 3/2012 |
| WO | 2019014880 A1 | 1/2019 |

OTHER PUBLICATIONS

Craftsman CMCA320, 20V* Max Cordless Multi-Use Garden Tool, Sep. 2022, www.craftsman.com, pp. 1-30 (Year: 2022).*

Bosch (Jul.-Sep. 2011). "GBH 14.4 V-Li Compact Professional SDS-plus hammer," Dealer Communication Pack, 1 page.

* cited by examiner

*Primary Examiner* — Michelle Lopez

(74) *Attorney, Agent, or Firm* — Morrison & Foerster LLP

(57) ABSTRACT

Disclosed herein is a hand-held power tool including a motor housing, a motor in the motor housing, an auger coupled to the motor and having a rotational axis, and a first handle coupled to the motor housing and including a grip. In some embodiments, the rotational axis of the auger and an axis of the grip subtend to an acute angle.

18 Claims, 8 Drawing Sheets

HAND-HELD POWER TOOL

FIELD

This disclosure generally relates to a hand-held power tool. More specifically, this disclosure relates to a hand-held power tool for achieving a comfortable wrist angle during operation.

BACKGROUND

Hand tools, such as a hand auger or a screwdriver, may require significant effort to operate. Moreover, because such tools are limited by how quickly a user can operate them, hand tools may be inefficient. Power tools may solve many of these shortcomings. For example, a user operating a drill may be able to drive a screw more quickly and with less effort than would be required using a screwdriver. Power tools are useful in many contexts such as construction, metalworking, gardening, and housework. For example, power tools may be used for drilling, cutting, sanding, digging, fastening, and/or the like. Power tools are often designed for their intended application. As a result, some power tools may be poorly suited to certain applications (e.g., those outside their intended use). For example, a drill for driving fasteners may be poorly suited to dig holes.

BRIEF SUMMARY

Disclosed herein are hand-held power tools. The hand-held power tools disclosed herein may promote comfortable operation by reducing the strain on a user from operating the hand-held power tools. For example, the hand-held power tools disclosed herein promote a comfortable wrist/elbow position for a user by reducing strain induced by ulnar deviation experienced by a user when operating the hand-held power tools in a vertical orientation. As another example, the hand-held power tools disclosed herein reduce an amount of force required to hold the hand-held power tools in a vertical orientation by positioning the center of mass of the hand-held power tools nearby a tool head of the hand-held power tools. As a third example, the hand-held power tools disclosed herein reduce strain associated with a user's wrist contacting a battery pack of the hand-held power tools by positioning the battery pack to provide wrist clearance for a user.

One implementation of the present disclosure is a hand-held power tool including a motor housing, a motor in the motor housing, an auger coupled to the motor and including a rotational axis, and a first handle coupled to the motor housing and including a grip. In some embodiments, the rotational axis of the auger and an axis of the grip subtend an acute angle as measured from the auger.

In some embodiments, the acute angle is 65 to 90 degrees. In some embodiments, the motor housing includes an air intake spaced a distance from the motor. In some embodiments, the hand-held power tool includes a controller positioned between the air intake and the motor. In some embodiments, the motor is positioned proximal to the auger. In some embodiments, the motor is positioned between the auger and a center of mass of the hand-held power tool. In some embodiments, the hand-held power tool includes a clutch configured to interrupt transmission of torque from the motor to the auger when a threshold torque value is exceeded. In some embodiments, the clutch includes a selector to select the threshold torque value from a number of torque values, wherein the selector is mechanically limited to a single selection from the number of torque values. In some embodiments, the angle is 74 degrees. In some embodiments, the hand-held power tool includes a battery foot coupled to the first handle and configured to slidably engage a battery, wherein an axis of engagement of the battery foot and the rotational axis of the auger subtend a second angle of 15 to 75 degrees measured from the first handle. In some embodiments, the hand-held power tool includes a bridge coupled to the motor housing and the battery foot. In some embodiments, the motor is positioned in the motor housing such that an axis of the bridge intersects the motor. In some embodiments, the hand-held power tool includes a second handle, wherein a longitudinal axis of the second handle is perpendicular to the rotational axis of the auger and the axis of the grip portion. In some embodiments, the motor housing includes an air intake spaced a distance from the motor. In some embodiments, a controller is positioned closer to the air intake than the motor. In some embodiments, a majority of the motor is positioned between a center of mass of the hand-held power tool and the auger. In some embodiments, the battery foot does not extend rearward of the axis of the grip.

Another implementation of the present disclosure is a hand-held power tool including a motor housing, a motor in the motor housing, a tool head coupled to the motor and including a rotational axis, a battery foot configured to slidably engage a battery, and a handle coupled to the motor housing and including a grip, wherein an axis of engagement of the battery foot and the rotational axis of the tool head subtend an angle greater than 0 degrees as measured from the handle.

In some embodiments, the angle is 15 to 75 degrees. In some embodiments, the hand-held power tool includes a bridge coupled to the motor housing and the battery foot. In some embodiments, the motor is positioned in the motor housing such that an axis of the bridge intersects the motor. In some embodiments, the hand-held power tool includes a second handle, wherein a longitudinal axis of the second handle is perpendicular to the rotational axis of the tool head and an axis of the grip. In some embodiments, the motor is positioned proximal to the tool head. In some embodiments, the tool head includes an auger bit or a weeding bit. In some embodiments, the hand-held power tool includes a second handle positioned behind the motor.

Another implementation of the present disclosure is a hand-held power tool including a motor housing, a motor in the motor housing, wherein the motor housing includes an air intake spaced a distance from the motor, a controller positioned between the air intake and the motor, a tool head coupled to the motor and including a rotational axis, and a handle coupled to the motor housing and including a grip, and wherein the motor is positioned between a center of mass of the hand-held power tool and the tool head.

In some embodiments, the hand-held power tool includes a bridge coupled to the motor housing, wherein the motor is positioned in the motor housing such that an axis of the bridge intersects the motor. In some embodiments, the motor is positioned proximal to the tool head. In some embodiments, the tool head includes an auger bit or a weeding bit.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Referring generally to the FIGURES, described herein is a hand-held power tool having a handle angle that promotes a comfortable wrist and/or elbow position for a user during operation. Speaking generally, the hand-held power tool may reduce strain on a user caused by ulnar deviation when the hand-held power tool is used in a vertical orientation. Additionally or alternatively, a center of mass of the hand-held power tool may be positioned nearby a tool head of the hand-held power tool, thereby increasing a stability of the hand-held power tool when used in a vertical orientation.

Figure 1:
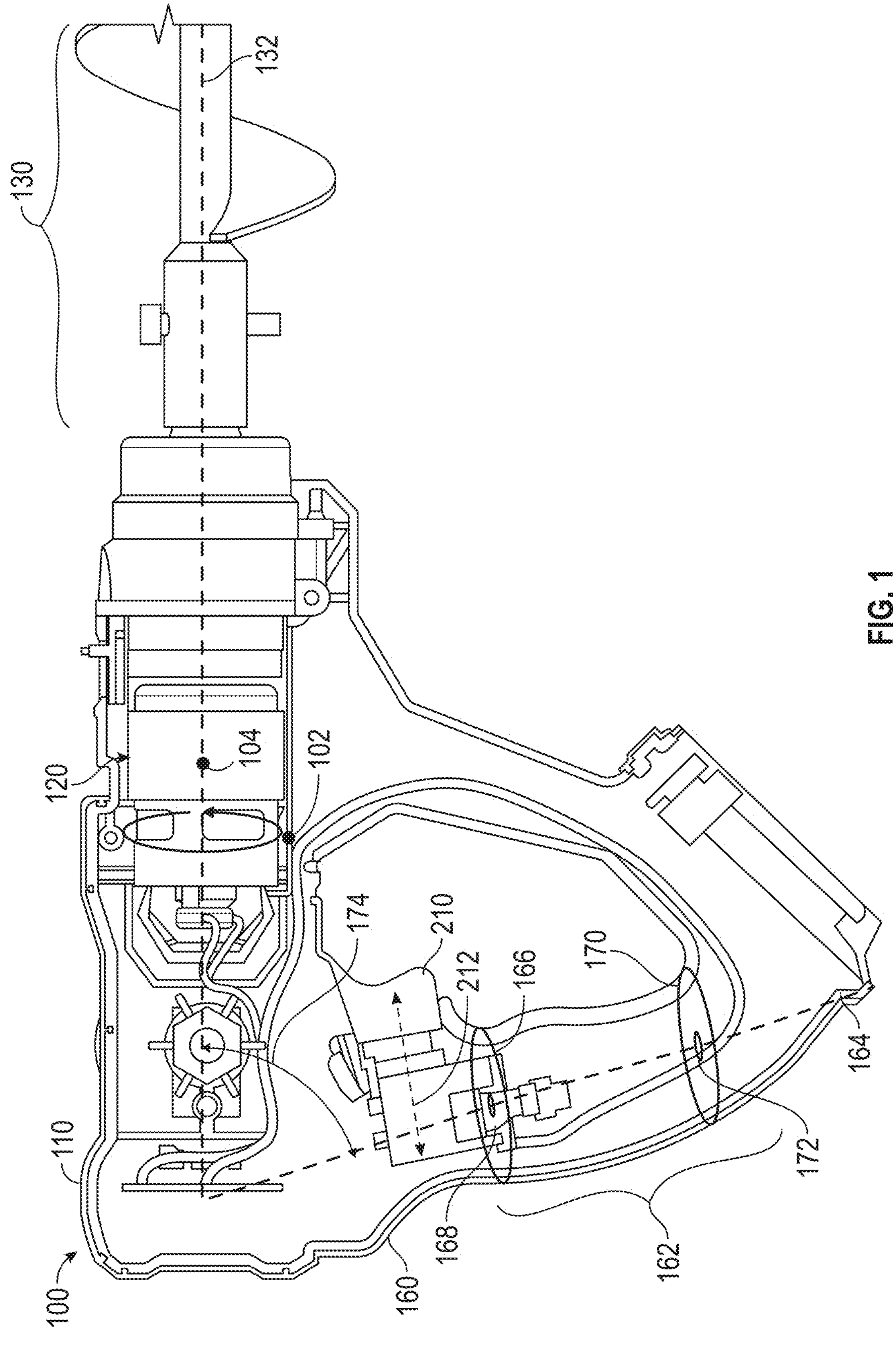
FIG. 1 illustrates a side view of an exemplary hand-held power tool, in accordance with an embodiment.

FIG. 1 illustrates a side view of exemplary hand-held power tool 100. Hand-held power tool 100 includes housing 110, motor 120 housed in housing 110, work implement 130 coupled to motor 120, and first handle 160. Motor 120 is attached to work implement 130, which, as shown in FIG. 1, may include an auger. A user may grip first handle 160 to operate hand-held power tool 100. In some embodiments, an axis of first handle 160 (shown as grip axis 164) subtends an acute angle (shown as first angle 174) with a rotation axis of work implement 130 (shown as rotational axis 132) that promotes a comfortable wrist and/or elbow position for a user during operation. In this way, hand-held power tool 100 may reduce strain on a user. Traditional tools (e.g., a conventional power drill, etc.) may feature a handle angled greater than 90 degrees relative to a tool head (e.g., at a 101 degree angle relative to a tool head, etc.), thereby causing strain on a user when the tool is used in a vertical orientation (e.g., when a tool head is used to drive vertically towards the ground, etc.). Conversely, first angle 174 of hand-held power tool 100 may reduce and/or eliminate this strain by producing a neutral wrist and/or elbow position, especially in digging contexts.

First handle 160 may include grip 162. Grip 162 may correspond to a portion of first handle 160 that receives the middle, ring, and pinky fingers of a user. In various embodiments, grip 162 is bounded at the top by trigger 210 and bounded at the bottom by base unit 220. For example, a top of grip 162 may be adjacent to trigger 210 and a bottom of grip 162 may be adjacent to base unit 220. Grip 162 may include grip axis 164. Grip axis 164 may be characterized by a line passing through first center 168 of cross-section 166 and second center 172 of cross-section 170. Cross-section 166 and cross-section 170 may be taken with respect to an outside circumference of grip 162. Cross-section 166 may be positioned adjacent to trigger 210 (e.g., where a middle finger of a user would contact first handle 160, etc.). Cross-section 170 may be positioned adjacent to base unit 220 (e.g., where a pinky finger of a user would contact first handle 160, etc.). In various embodiments, cross-section 166 and/or cross-section 170 are taken with respect to a plane parallel to an axis of actuation of trigger 210 (shown as axis 212). Many planes parallel to axis 212 may exist. In various embodiments, cross-section 166 and/or cross-section 170 are taken with respect to the specific plane which (i) has a normal vector that intersects rotational axis 132 and (ii) is parallel to axis 212. As shown in FIG. 1, the cross-sectional plane of cross-section 166 and/or cross-section 170 extend into and out of the page. In some embodiments, first center 168 and second center 172 correspond to a centroid of cross-section 166 and cross-section 170 respectively. It should be understood that while first center 168 and second center 172 are shown as circular in FIG. 1, this is for illustrative purposes only and first center 168 and second center 172 are respective points in 3-dimensional space. As mentioned above, rotational axis 132 and grip axis 164 may subtend first angle 174 measured from work implement 130. First angle 174 may be in a range of 65 degrees to 90 degrees. For example, first angle 174 may be a 74-degree angle.

Figure 2A:
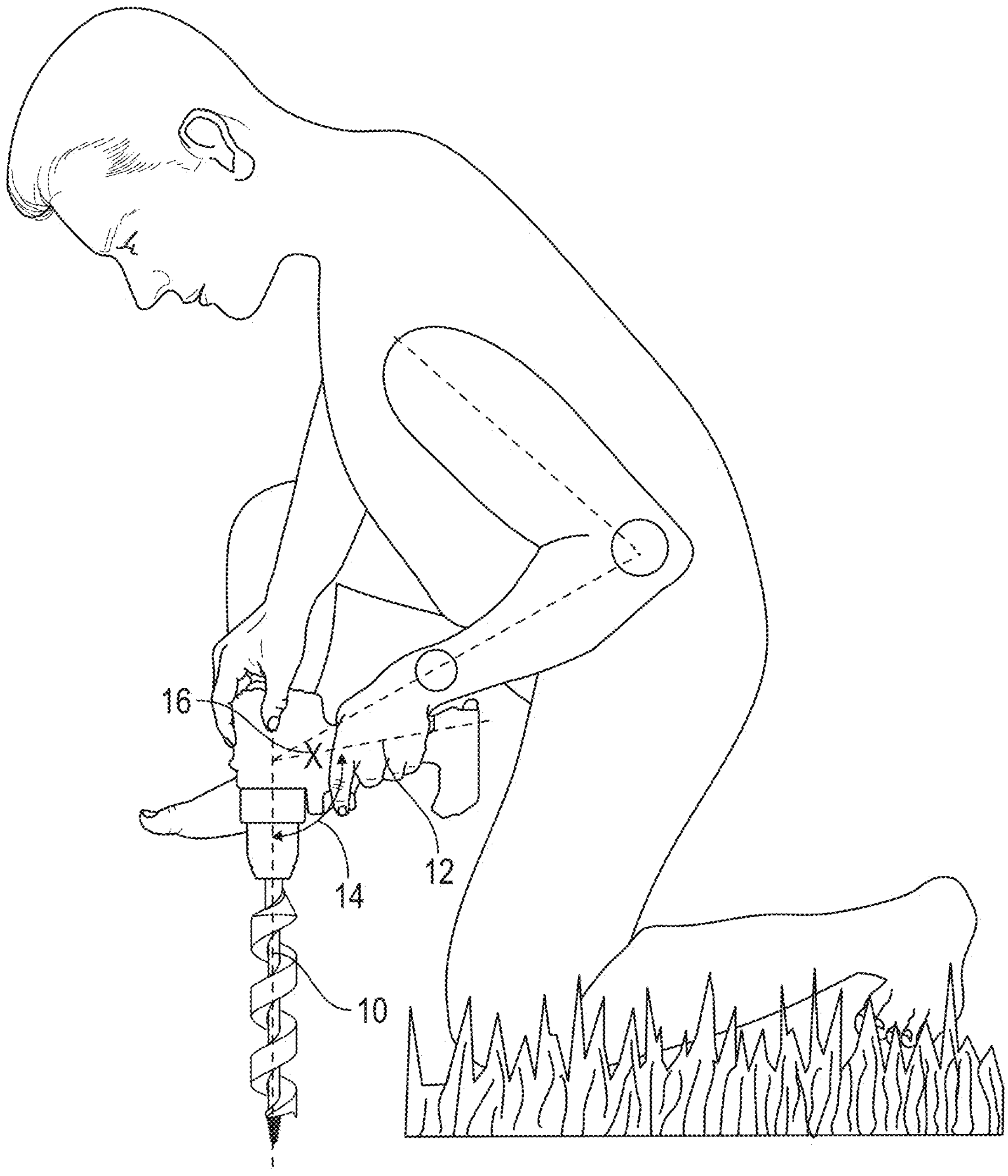
FIG. 2A (Prior Art)
FIG. 2A is an exemplary illustration of a traditional tool in use by a user.

Turning now to FIG. 2A, an exemplary illustration of a traditional tool in use by a user is shown for purposes of comparison. Unlike hand-held power tool 100, an axis of the handle of the traditional tool (shown as grip axis 12) may subtend an obtuse angle (shown as angle 14) with respect to a rotational axis of a work implement of the traditional tool (shown as rotational axis 10). Angle 14 may cause strain on a user when operating the tool in a vertical orientation, as shown, due to abduction of the user's wrist and/or positioning of the user's arm. For example, when using the tool, a user's arm may start in a highly compressed position, thereby causing strain on the user's elbow. In contrast, first angle 174 of hand-held power tool 100 is acute which may reduce abduction of a user's wrist to create a more natural wrist position, thereby reducing strain on a user. In various embodiments, a natural wrist position is one in which a line passing through the knuckles (e.g., metacarpophalangeal joints) of an individual's hand is approximately perpendicular to an axis of the individual's forearm (e.g., running from the radial head to the ulnar fovea).

Figure 2B:
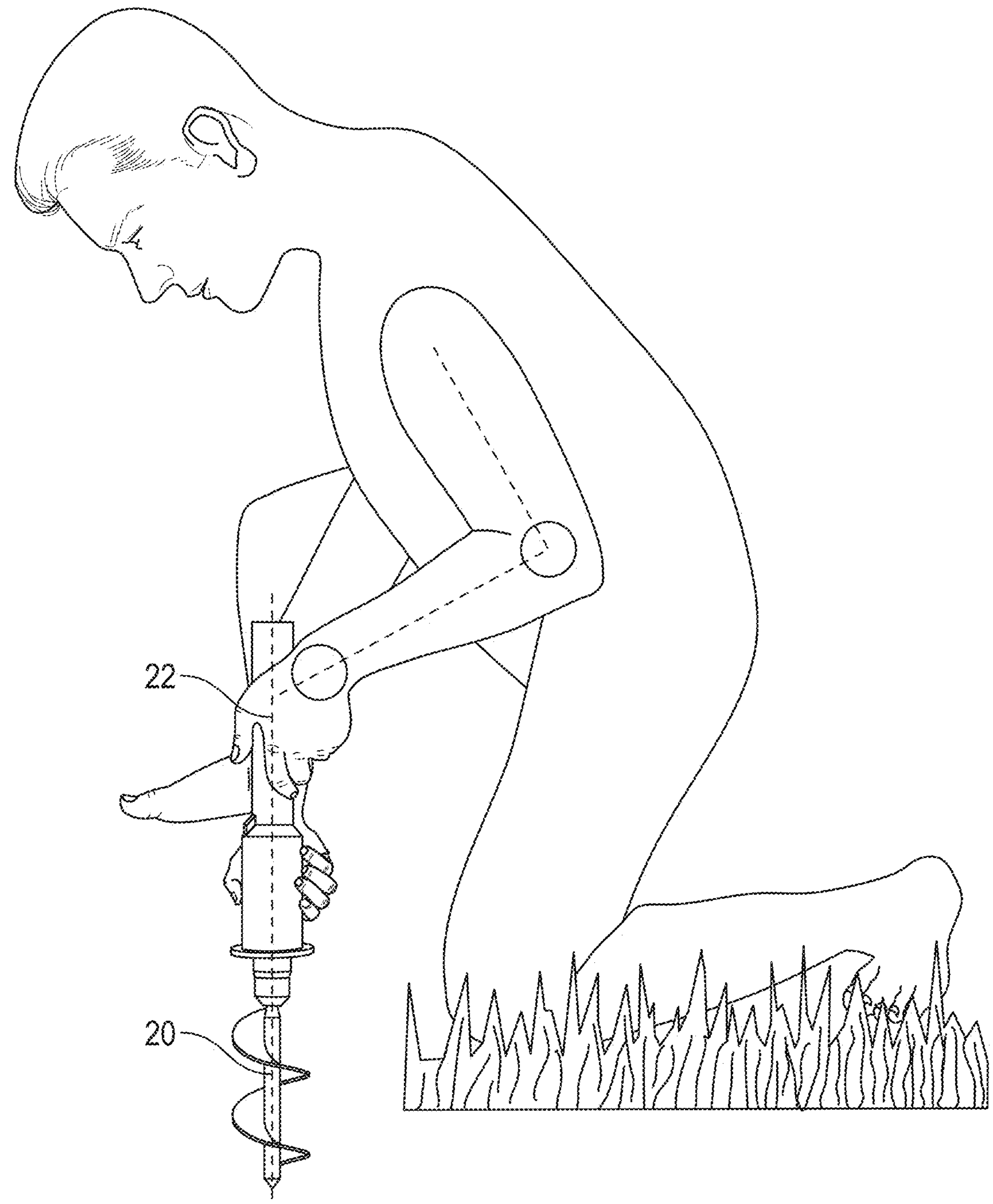
FIG. 2B (Prior Art)
FIG. 2B is an exemplary illustration of another traditional tool in use by a user.
Figure 2C:
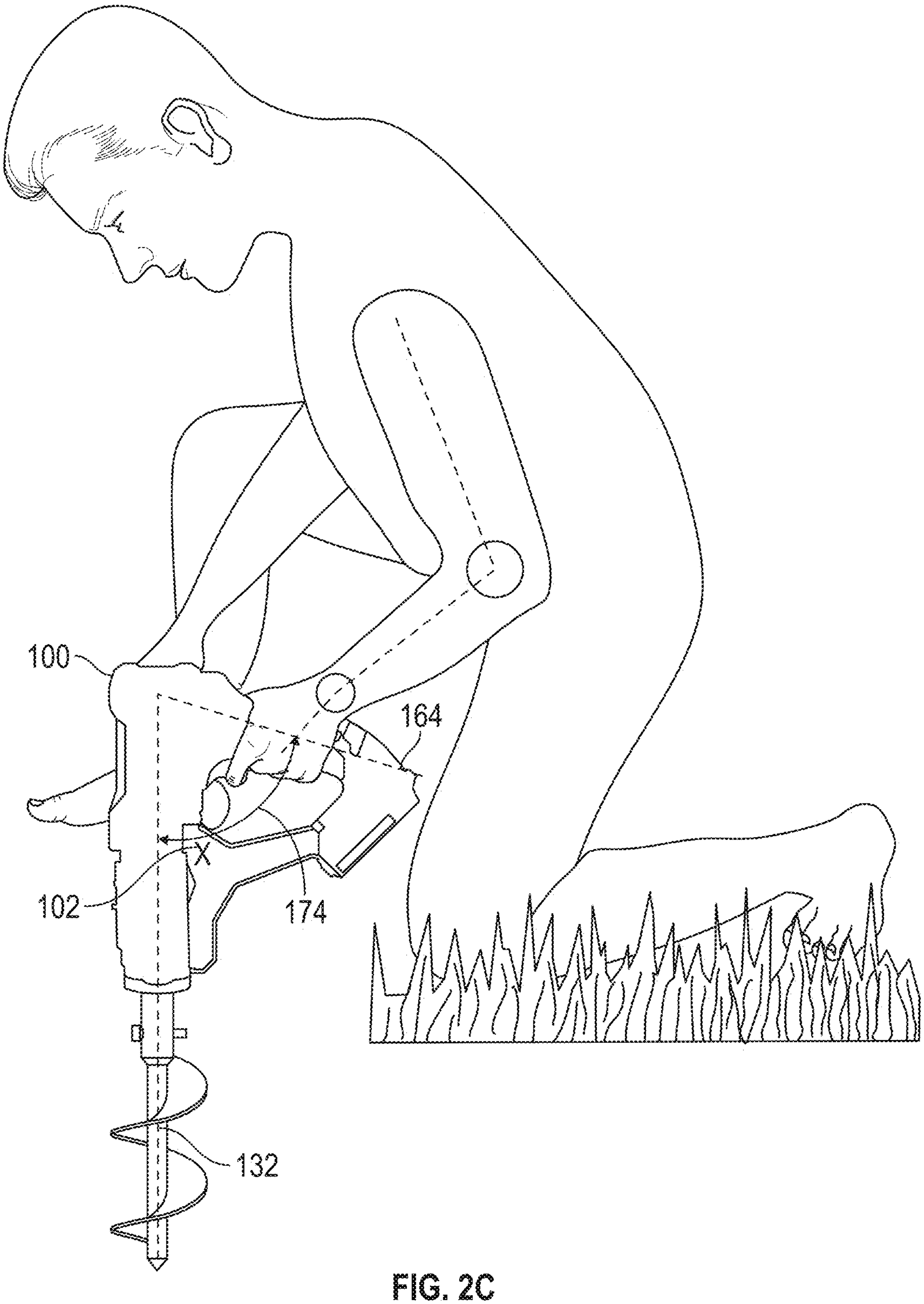
FIG. 2C is an exemplary illustration of the hand-held power tool of FIG. 1 in use by a user, in accordance with an embodiment.

FIG. 2B is another exemplary illustration of a traditional tool in use by a user, shown for the purposes of comparison. Unlike hand-held power tool 100, an axis of the handle of the traditional tool (shown as grip axis 22) may be coaxial with a rotational axis of the traditional tool (shown as rotational axis 20), thereby causing twisting forces from operation of the tool to be transmitted to a user's wrist. These twisting forces may be uncomfortable or even dangerous. Hand-held power tool 100 may reduce this twisting force by positioning grip axis 164 separate of rotational axis 132 (e.g., as shown in FIG. 2C), thereby increasing the usability and comfort of hand-held power tool 100. In addition, hand-held power tool 100 may include second handle 240 (as discussed below) to facilitate stabilizing hand-held power tool 100 and/or reduce transmission of twisting forces to a user's wrist. Moreover, like the traditional tool in FIG. 2A, the traditional tool in FIG. 2B may cause increased abduction of a user's wrist, which may lead to strain and discomfort. However, as discussed above, hand-held power tool 100 may reduce this strain by creating a more natural wrist angle that involves less abduction of the user's wrist.

FIG. 2C is an exemplary illustration of hand-held power tool 100 in use by a user. In various embodiments, first angle 174 promotes a neutral wrist and/or elbow position for a user during operation of hand-held power tool 100, especially in digging contexts. For example, first angle 174 may reduce abduction/bending of a user's wrist, thereby reducing strain on the user. In some embodiments, hand-held power tool 100 facilitates vertical operation (e.g., in digging contexts as shown in FIG. 2C). For example, center of mass 102 may be positioned near work implement 130. Traditional tools (like that discussed in FIG. 2A) may have a weight distribution configured for horizontal operation (e.g., for securing a fastener to a wall, etc.). For example, a conventional power drill (such as the tool of FIG. 2A) may have a motor positioned towards a rear of the drill (e.g., positioned at or above a grip of the handle, etc.), thereby creating a relatively high center of mass (shown as center of mass 16 in FIG. 2A) during vertical operation. Conversely, in some embodiments herein, motor 120 may be positioned towards a front of hand-held power tool 100 (as shown in FIG. 1), thereby lowering the center of mass during vertical operation, reducing a tilting force, and increasing the usability of hand-held power tool 100. In various embodiments, motor 120 is positioned forward of a center of mass of hand-held power tool 100 (shown as center of mass 102 in FIG. 1). For example, a center of motor 120 may be positioned forward of center of mass 102. Additionally or alternatively, a center of mass of motor 120 (shown as center of mass 104 in FIG. 1) is positioned between center of mass 102 and work implement 130.

Referring again to FIG. 1, first handle 160 may be coupled to housing 110. For example, first handle 160 may be integral with housing 110. In some embodiments, first handle 160 is positioned rearward of center of mass 102, thereby increasing a stability of hand-held power tool 100 during use. Housing 110 may be elongated. Traditional tools may feature a short housing (e.g., as measured from a front of the tool to a rear of the tool). However, by elongating housing 110, hand-held power tool 100 may position first handle 160 farther from a front of the tool, thereby positioning a user's hands farther from the ground during vertical operation and/or creating a more ergonomic body position that facilitates greater arm extension during operation. In various embodiments, first handle 160 extends from housing 110 along grip axis 164.

In some embodiments, trigger 210 is coupled to first handle 160. Trigger 210 may activate motor 120. In various embodiments, trigger 210 is a variable speed trigger. For example, a speed of motor 120 may be varied by pulling (e.g., actuating) trigger 210 more or less. Trigger 210 may be actuated along axis 212. For example, a user may actuate trigger 210 using an index finger to cause trigger 210 to operate a switch which in turn causes power to be provided to motor 120. Trigger 210 is shown in greater detail with reference to FIG. 5, below.

Motor 120 may include a direct current (DC) motor. Additionally or alternatively, motor 120 may include an alternating current (AC) motor. Motor 120 may provide power to work implement 130. For example, work implement 130 may be directly coupled to motor 120 (e.g., via a drive shaft, etc.) to receive mechanical power therefrom. Alternatively, the work implement 130 may be coupled to the motor 120 through a gear mechanism (not shown) or other transmission. In various embodiments, motor 120 is positioned proximal to work implement 130. In various embodiments, motor 120 is coaxial to rotational axis 132.

Work implement 130 may include an auger (as shown in FIG. 1). For example, work implement 130 may include an earth auger having a rotating shaft with one or more blades (e.g., helical screw blades, etc.) attached at an end of the rotating shaft. Additionally or alternatively, work implement 130 may include other tools/bits such as a weeding bit (shown in FIG. 6). In various embodiments, a user operates hand-held power tool 100 to create a hole in the ground using work implement 130 (e.g., as shown in FIG. 2). In various embodiments, work implement 130 is constructed of a metal. However, it should be understood that work implement 130 may be constructed of other materials (or composites thereof) as well. In various embodiments, work implement 130 is changeable. For example, hand-held power tool 100 may include a coupling mechanism (shown as bolt 134) to mechanically couple one or more tool heads to motor 120 (e.g., via a chuck, a pin linkage, etc.). In various embodiments, work implement 130 includes a receptacle that receives a driven shaft of motor 120. For example, work implement 130 may slide over a driven shaft of motor 120 and be coupled to the driven shaft via bolt 134 such that work implement 130 may not slide off of the driven shaft and may not rotate relative to the driven shaft. Bolt 134 may pass through a hole in work implement 130 and/or a driven shaft of motor 120. In some embodiments, bolt 134 is secured via a fastener such as a cotter pin. Additionally or alternatively, bolt 134 may screw into work implement 130 and/or a driven shaft of motor 120 and be secured thereby. In various embodiments, work implement 130 rotates about rotational axis 132.

Figure 3:
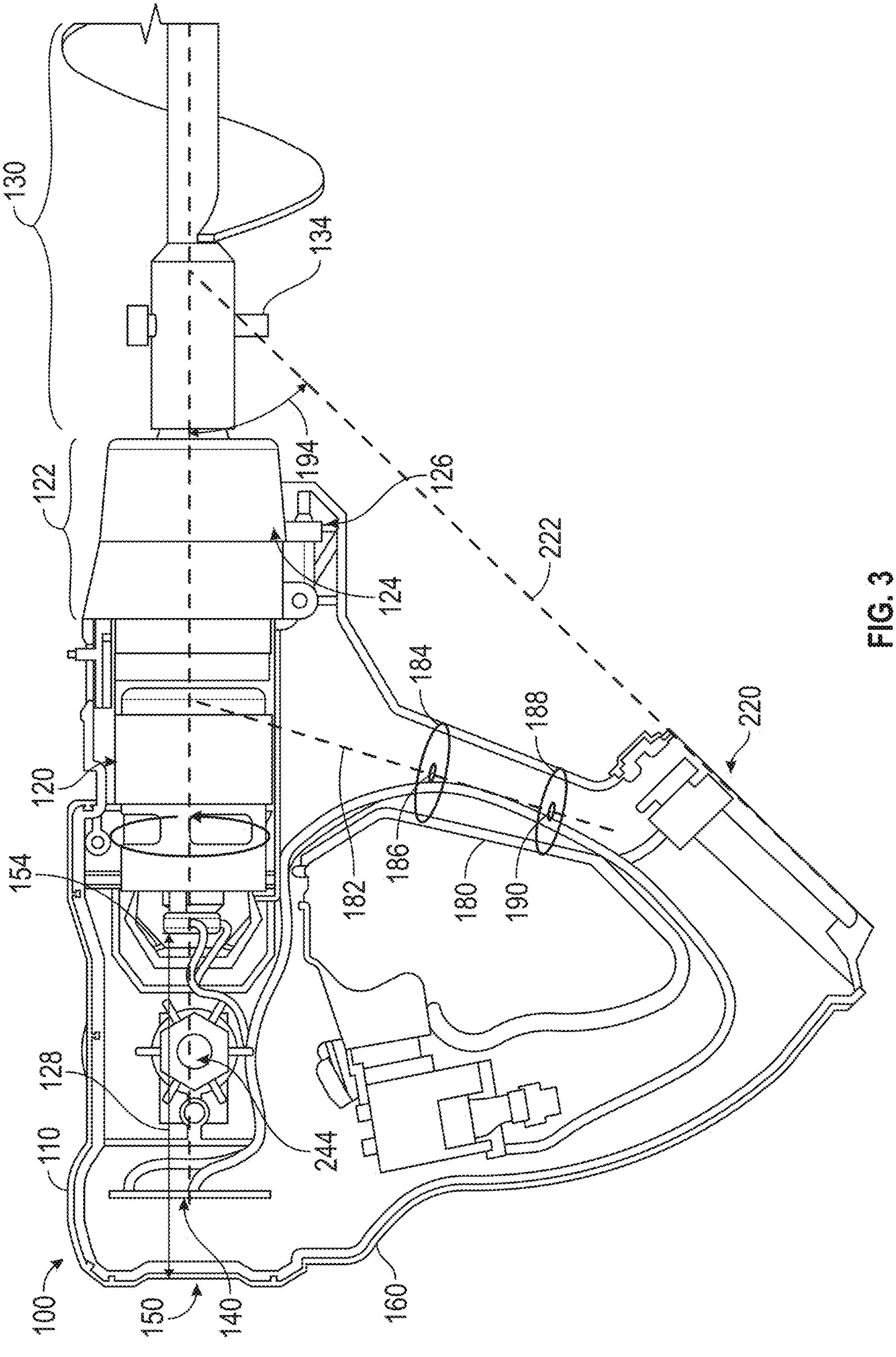
FIG. 3 illustrates exemplary components of the hand-held power tool of FIG. 1, in accordance with an embodiment.

FIG. 3 illustrates exemplary components of hand-held power tool 100. Housing 110 may include air intake 150. In some embodiments, housing 110 includes air intake 152 (shown in FIG. 4) and air exhaust 154. Air intake 150, air intake 152, and/or air exhaust 154 may include one or more apertures in housing 110 to facilitate a transfer of air between an outside of housing 110 and an inside of housing 110. For example, air may be drawn into housing 110 via air intake 150 and/or air intake 152, pass through motor 120, and exit housing 110 via air exhaust 154. In various embodiments, hand-held power tool 100 includes a fan. For example, an electric fan to may be coupled next to air intake 150 to dissipate heat from motor 120. Additionally or alternatively, motor 120 may include a fan. In various embodiments, a portion of hand-held power tool 100 nearby work implement 130 is considered a "front" of hand-held power tool 100 and a portion of hand-held power tool 100 nearby air intake 150 is considered a "back" of hand-held power tool 100.

In various embodiments, motor 120 is spaced distance 128 apart from air intake 150. Spacing motor 120 distance 128 apart from air intake 150 may provide various benefits. For example, moving motor 120 forward (e.g., towards work implement 130, etc.) may create space in housing 110 to position additional components, such as controller 140. As another example, moving motor 120 forward may facilitate increased airflow from air intake 150 to an inside of housing 110, thereby improving heat transfer for components such as motor 120. Furthermore, moving the motor 120 forward lowers the center of mass of the tool when used in a vertical orientation as explained above. In some embodiments, distance 128 is at least 20 millimeters (mm). Additionally or alternatively, distance 128 may be greater than a length of motor 120. For example, if motor 120 is 80 mm along its axis, then distance 128 may be 85 mm.

Hand-held power tool 100 may include controller 140. Controller 140 may be positioned within housing 110. In various embodiments, controller 140 is positioned between air intake 150 and motor 120. Controller 140 may include a circuit that receives inputs from trigger 210 and/or base unit 220 and controls motor 120 based on the inputs. For example, controller 140 may control a speed of motor 120 based on an amount of depression of trigger 210.

Motor 120 may include clutch 122. Clutch 122 may engage/disengage mechanical power transmission from a drive shaft of motor 120 to a driven shaft (e.g., a drill chuck, work implement 130, etc.). Clutch 122 may include selector 124. Selector 124 may facilitate selection of a threshold torque value from a number of torque values. For example, clutch 122 may interrupt transmission of torque from a shaft of motor 120 to a driven shaft (e.g., a drill chuck, work implement 130, etc.) when a threshold torque value is exceeded, and a user may select the threshold torque value using selector 124. In some embodiments, clutch 122 includes a torque limiter (shown as limiter 126). Limiter 126 may mechanically limit selector 124 to a single selection from a number of torque values. In some embodiments, limiter 126 includes a mechanical fastener. For example, limiter 126 may include a mechanical fastener that fastens a clutch collar of selector 124 to housing 110. Additionally or alternatively, limiter 126 may include a shear pin, a synchronous magnetic torque limiter, a ball detent type limiter, a pawl and spring type limiter, and/or the like. In various embodiments, selector 124 is mechanically limited to a single threshold torque value via limiter 126. In some embodiments, motor 120 includes an impact driver. The impact driver may facilitate digging through obstacles in the ground such as rocks or roots and/or digging through hard soil.

Hand-held power tool 100 may include base unit 220. In various embodiments, base unit 220 is coupled to first handle 160. Base unit 220 may receive a power source to power hand-held power tool 100. For example, base unit 220 may include a battery footing to receive a slide-type battery pack. As another example, base unit 220 may include a corded base unit to receive AC power. Base unit 220 may slidably engage a battery along axis of engagement 222. For example, a user may slide a battery onto a battery footing of base unit 220 along axis of engagement 222. In various embodiments, a battery pack is slid onto base unit 220 from behind (e.g., such that the battery pack travels along axis of engagement 222 from first handle 160 towards work implement 130).

In some embodiments, base unit 220 and/or the power source (e.g., a slide-type battery pack, etc.) include a release mechanism. For example, a slide-type battery pack may include a button that releases a mechanical linkage holding the battery pack in place such that the battery pack can be slid off base unit 220. Rotational axis 132 and axis of engagement 222 may subtend second angle 194 measured from first handle 160. In various embodiments, second angle 194 is in a range of 30 degrees to 55 degrees. In some embodiments, second angle 194 is in a range of 0 degrees to 90 degrees. For example, second angle 194 may range from 15 degrees to 75 degrees. In various embodiments, second angle 194 promotes comfortable operation of hand-held power tool 100 by preventing wrist and/or forearm contact with base unit 220 and/or the power source during vertical operation of hand-held power tool 100. For example, second angle 194 may provide wrist clearance when operating hand-held power tool 100 vertically such that a user's wrist is clear of (e.g., does not contact under normal operation) the battery pack, thereby preventing strain/discomfort on the user. In various embodiments, hand-held power tool 100 achieves this wrist clearance by positioning base unit 220 so that it does not extend beyond grip axis 164. In comparison, traditional tools may include a battery pack that extends beyond a grip axis of the tool such that the battery contacts a user's wrist when the user abducts/adducts their wrist during normal operation (e.g., as shown in FIG. 2C). Additionally, second angle 194 may facilitate insertion/ejection of the power source from base unit 220.

Hand-held power tool 100 may include bridge 180. Bridge 180 may be coupled to housing 110. For example, bridge 180 may be integral with housing 110. In various embodiments, bridge 180 mechanically supports first handle 160. For example, bridge 180 may prevent cantilevering of first handle 160 during operation of hand-held power tool 100. In various embodiments, bridge 180 is coupled to base unit 220. For example, bridge 180 may extend between housing 110 and a battery foot of base unit 220 such that bridge 180 is coupled to housing 110 and the battery foot of base unit 220. In some embodiments, bridge 180 extends from housing 110 along axis 182. Axis 182 may be characterized by a line passing through first center 186 of cross-section 184 and second center 190 of cross-section 188. Cross-section 184 and cross-section 188 may be taken with respect to an outside circumference of bridge 180. In some embodiments, first center 186 and second center 190 correspond to a centroid of cross-section 184 and cross-section 188 respectively. Cross-section 184 may be positioned adjacent to housing 110. Cross-section 188 may be positioned adjacent to base unit 220. In various embodiments, motor 120 is positioned such that axis 182 intersects motor 120.

Figure 4:
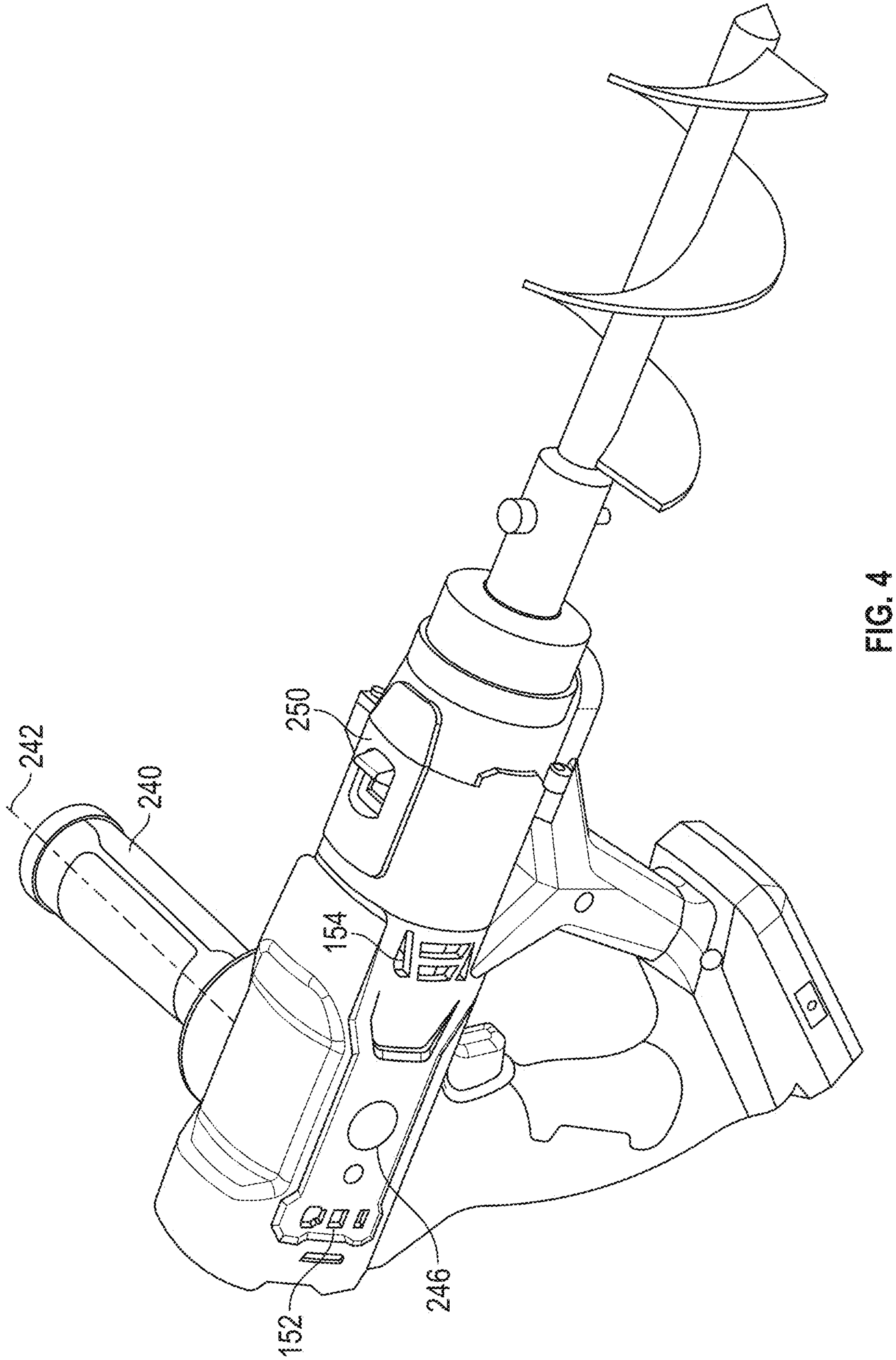
FIG. 4 illustrates a perspective view of the hand-held power tool of FIG. 1, in accordance with an embodiment.

FIG. 4 illustrates a perspective view of exemplary hand-held power tool 100. Hand-held power tool 100 may include second handle 240. Second handle 240 facilitates stabilizing hand-held power tool 100. For example, a user may use second handle 240 to drive work implement 130 into the ground while preventing hand-held power tool 100 from twisting when it encounters obstacles such as rocks. Second handle 240 may be coupled to housing 110. For example, second handle 240 may be integral with housing 110. In some embodiments, second handle 240 is detachably coupled to housing 110 via a fastener (shown as fastener 244 in FIG. 3). For example, housing 110 may include an attachment point (shown as attachment point 246) having a female thread that receives a threaded portion on an end of second handle 240. In various embodiments, attachment point 246 is positioned near a rear of hand-held power tool 100. Traditional tools may position a secondary handle near a front of the tool (e.g., near the chuck, etc.). However, this may limit a range of motion of the user because the user's hands start on different planes, thereby causing one arm to be more extended than another during use. By positioning attachment point 246 near a rear of hand-held power tool 100, a user's hands start on a similar plane, thereby facilitating a greater range of motion. In some embodiments, second handle 240 extends from housing 110 along axis 242. Axis 242 is the longitudinal axis of second handle 240. Axis 242 may be perpendicular to rotational axis 132 and grip axis 164. A user may grip second handle 240 to operate hand-held power tool 100. For example, a user may grip first handle 160 with a first hand and second handle 240 with a second hand. In various embodiments, second handle 240 reduces torquing fatigue on a user's hand/wrist/arm. For example, a user may use a first hand to operate hand-held power tool 100 via grip 162 and may experience a rotational force (e.g., about rotational axis 132) due to the drilling action of work implement 130. This rotational force may be especially pronounced when work implement 130 encounters an obstacle such as a rock, thereby causing a discomfort on a user's hand/wrist/arm. However, a user may hold second handle 240 using a second hand to further stabilize hand-held power tool 100, thereby reducing strain on their other hand/wrist/arm. Second handle 240 is shown on a left side of hand-held power tool 100 (when viewed from behind) in FIG. 4. However, it should be understood that second handle 240 may additionally or alternatively be positioned on a right side of hand-held power tool 100. For example, a user may detach second handle 240 from a left side of hand-held power tool 100 and attach second handle 240 to a right side of hand-held power tool 100 as described above (e.g., using a fastener integral with housing 110, etc.), thereby facilitating operation of hand-held power tool 100 by different individuals (e.g., right-handed individuals and left-handed individuals, etc.). In various embodiments, second handle 240 is positioned between motor 120 and air intake 150, thereby facilitating a comfortable elbow position during operation.

In some embodiments, hand-held power tool 100 includes speed selector 250. Speed selector 250 may facilitate selecting between a number of motor speeds. For example, a user may select a low speed for precise weeding and a high speed for digging through dirt. Speed selector 250 may control a rotational speed of motor 120. In some embodiments, speed selector 250 may control a rotational direction of motor 120. For example, speed selector 250 may facilitate switching between clockwise rotation of motor 120 and counterclockwise rotation of motor 120 (e.g., forward and reverse directions).

Figure 5:
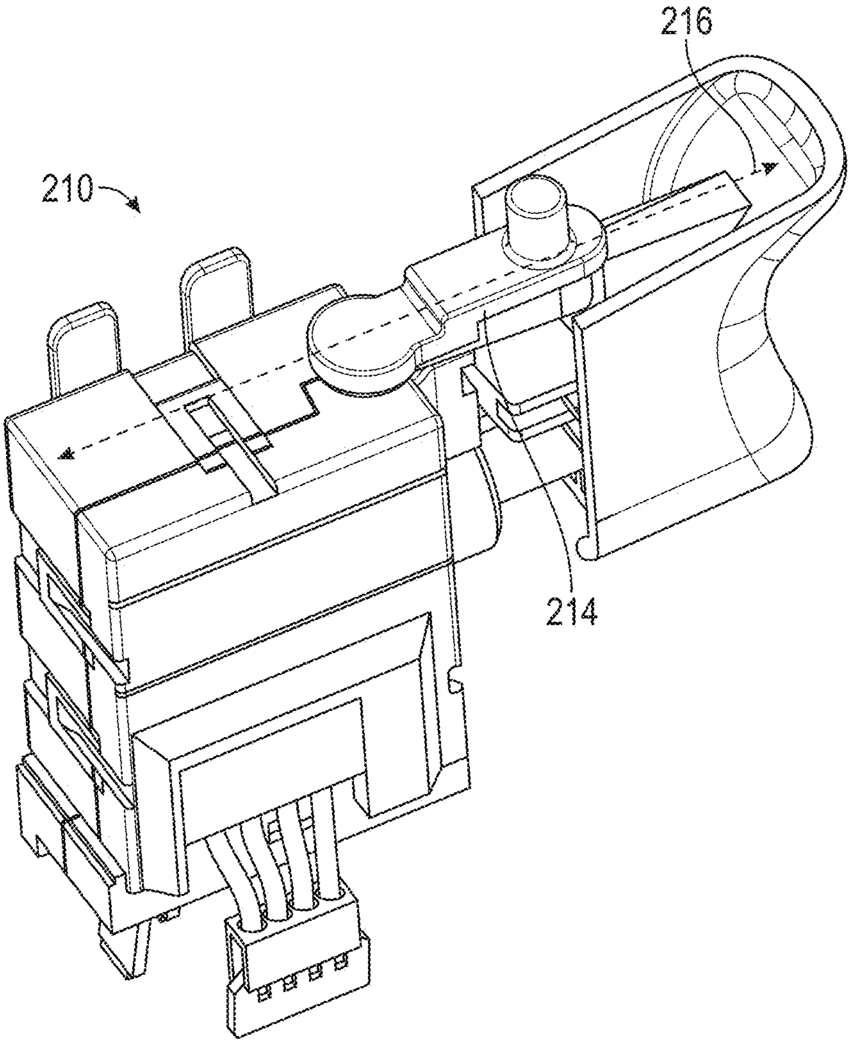
FIG. 5 illustrates a perspective view of a trigger of the hand-held power tool of FIG. 1, in accordance with an embodiment.

FIG. 5 illustrates a perspective view of exemplary trigger 210. In some embodiments, trigger 210 includes switch 214. Switch 214 may facilitate selecting a rotational direction of motor 120. For example, switch 214 may facilitate switching between clockwise rotation of motor 120 and counterclockwise rotation of motor 120 (e.g., forward and reverse directions). Additionally or alternatively, switch 214 may facilitate locking trigger 210 so that it cannot be operated, thereby preventing accidental operation of hand-held power tool 100. In some embodiments, switch 214 physically locks trigger 210 such that trigger 210 cannot be depressed. Additionally or alternatively, switch 214 may disable trigger 210 such that depression of trigger 210 no longer operates motor 120. Switch 214 may be operated/toggled along axis 216. For example, switch 214 may be positioned in a forward, reverse, and/or a lock position along axis 216.

Figure 6:
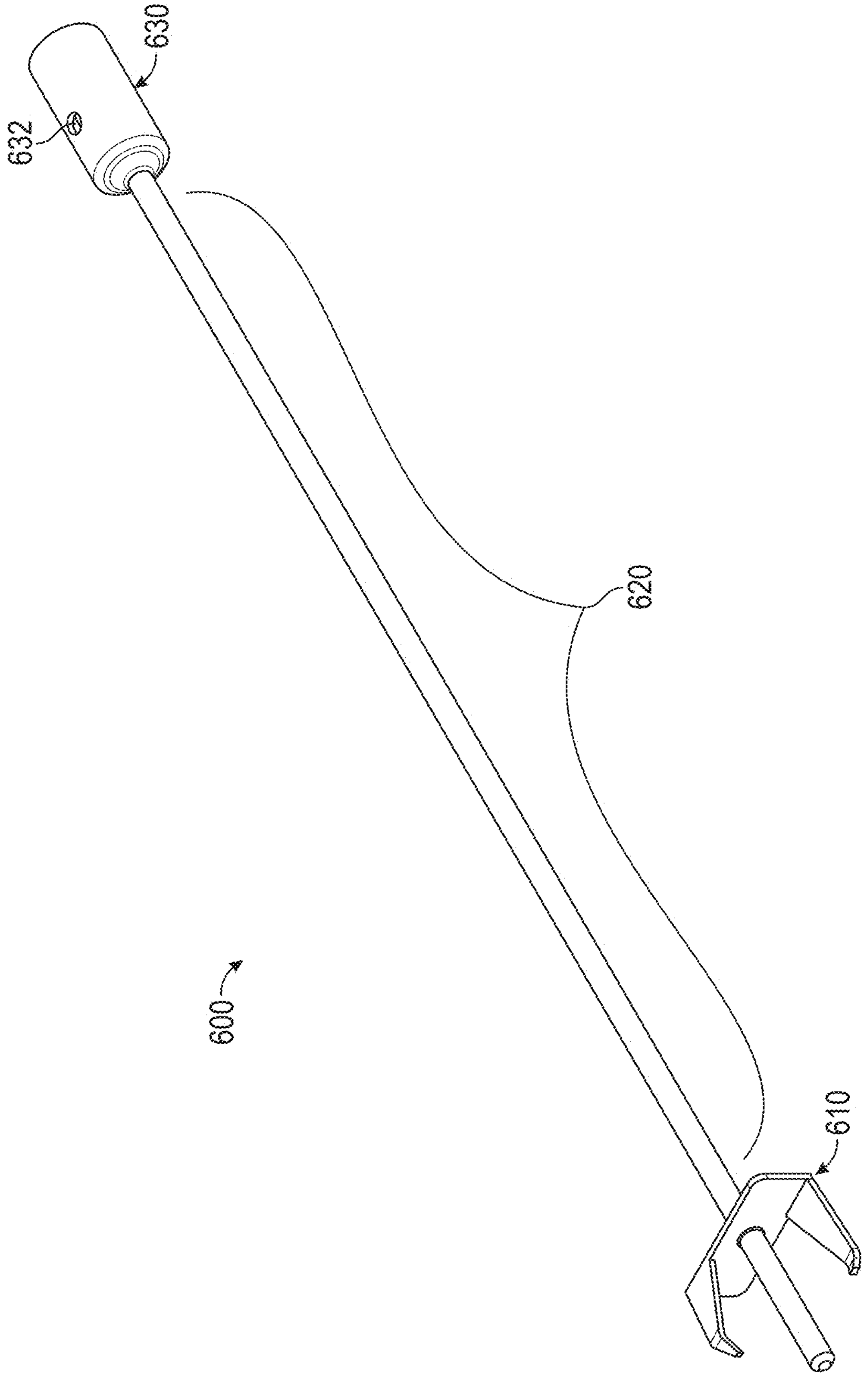
FIG. 6 illustrates an exemplary tool head of the hand-held power tool of FIG. 1, in accordance with an embodiment.

FIG. 6 illustrates a perspective view of exemplary weeding bit 600. Weeding bit 600 is usable to remove plant material (e.g., weeds, etc.) from the ground. Weeding bit 600 is shown to include head 610 connected to connector 630 via shaft 620. Head 610 may be mounted on an end of shaft 620 and may include one or more blades to facilitate removing plant material from the ground. Connector 630 may facilitate mechanically coupling weeding bit 600 to a driven shaft of motor 120. For example, connector 630 may include a socket that slides over a driven shaft of motor 120. In some embodiments, connector 630 includes coupling receiver 632 to receive a coupling mechanism (e.g., a bolt, a pin, etc.) to facilitate mechanically coupling weeding bit 600 to motor 120.

Generally, as used herein, the term "substantially" is used to describe element(s) or quantit(ies) ideally having an exact quality (e.g., fixed, the same, uniformed, equal, similar, proportional), but practically having qualities functionally equivalent to the exact quality. For example, an element or quantity is described as being substantially fixed or uniformed can deviate from the fixed or uniformed value, as long as the deviation is within a tolerance of the system (e.g., accuracy requirements, etc.). As another example, two elements or quantities described as being substantially equal can be approximately equal, as long as the difference is within a tolerance that does not functionally affect a system's operation.

Likewise, although some elements or quantities are described in an absolute sense without the term "substantially", it is understood that these elements and quantities can have qualities that are functionally equivalent to the absolute descriptions. For example, in some embodiments, a ratio is described as being one. However, it is understood that the ratio can be greater or less than one, as long as the ratio is within a tolerance of the system (e.g., accuracy requirements, etc.).

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A hand-held power tool comprising:

a motor housing;

a motor in the motor housing, wherein the motor housing comprises an air intake spaced a distance from the motor;

a controller positioned between the air intake and the motor;

an auger coupled to the motor and comprising a rotational axis; and a first handle coupled to the motor housing and including a grip, wherein the rotational axis of the auger and an axis of the grip subtend to an acute angle, wherein the motor is positioned between the auger and a center of mass of the hand-held power tool.

2. The hand-held power tool of claim 1, wherein the acute angle is 65 to 90 degrees.

3. The hand-held power tool of claim 1, further comprising a clutch configured to interrupt transmission of torque from the motor to the auger when a threshold torque value is exceeded, wherein the clutch comprises a selector to select the threshold torque value from a plurality of torque values, and wherein the selector is mechanically limited to a single selection from the plurality of torque values.

4. The hand-held power tool of claim 1, wherein the acute angle is 74 degrees.

5. The hand-held power tool of claim 1, further comprising a battery foot coupled to the first handle and configured to slidably engage a battery, wherein an axis of engagement of the battery foot and the rotational axis of the auger subtend a second angle of 15 to 75 degrees.

6. The hand-held power tool of claim 5, wherein the battery foot does not extend rearward of the axis of the grip.

7. The hand-held power tool of claim 5, further comprising a bridge coupled to the motor housing and the battery foot.

8. The hand-held power tool of claim 7, wherein the motor is positioned in the motor housing such that an axis of the bridge intersects the motor.

9. The hand-held power tool of claim 1, further comprising a second handle, wherein a longitudinal axis of the second handle is perpendicular to the rotational axis of the auger and the axis of the grip-portion.

10. A hand-held power tool comprising:

a motor housing;

a motor in the motor housing, wherein the motor housing comprises an air intake spaced a distance from the motor;

a controller positioned between the air intake and the motor;

a tool head coupled to the motor and comprising a rotational axis;

a battery foot configured to slidably engage a battery; and a handle coupled to the motor housing and including a grip, wherein an axis of engagement of the battery foot and the rotational axis of the tool head subtend an angle greater than 0 degrees, and wherein the motor is positioned between the tool head and a center of mass of the hand-held power tool.

11. The hand-held power tool of claim 10, wherein the angle is 15 to 75 degrees.

12. The hand-held power tool of claim 10, further comprising a bridge coupled to the motor housing and the battery foot.

13. The hand-held power tool of claim 12, wherein the motor is positioned in the motor housing such that an axis of the bridge intersects the motor.

14. The hand-held power tool of claim 12, further comprising a second handle, wherein the second handle is positioned behind the motor.

15. The hand-held power tool of claim 10, wherein the motor is positioned proximal to the tool head.

16. The hand-held power tool of claim 10, wherein the tool head comprises an auger bit or a weeding bit.

17. A hand-held power tool comprising:

a motor housing;

a motor in the motor housing, wherein the motor housing comprises an air intake spaced a distance from the motor;

a controller positioned between the air intake and the motor;

a tool head coupled to the motor and comprising a rotational axis; and a handle coupled to the motor housing and including a grip; and wherein the motor is positioned between the tool head and a center of mass of the hand-held power tool.

18. The hand-held power tool of claim 17, further comprising a bridge coupled to the motor housing, wherein the motor is positioned in the motor housing such that an axis of the bridge intersects the motor.

* * * * *